United States Patent
Dettinger et al.

(10) Patent No.: US 7,107,262 B2
(45) Date of Patent: Sep. 12, 2006

(54) INCREMENTAL DATA QUERY PERFORMANCE FEEDBACK MODEL

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 10/370,235

(22) Filed: Feb. 20, 2003

(65) Prior Publication Data
US 2004/0167873 A1   Aug. 26, 2004

(51) Int. Cl.
*G06F 17/30* (2006.01)

(52) U.S. Cl. .................................................. 707/3

(58) Field of Classification Search ............. 707/1–10, 707/100–104.1, 200–206
See application file for complete search history.

(56) References Cited

U.S. PATENT DOCUMENTS

| | | | |
|---|---|---|---|
| 5,819,255 A * | 10/1998 | Celis et al. ................... 707/2 |
| 6,725,227 B1 | 4/2004 | Li | |
| 2004/0215626 A1 * | 10/2004 | Colossi et al. ............. 707/100 |

* cited by examiner

*Primary Examiner*—Diane Mizrahi
(74) *Attorney, Agent, or Firm*—Patterson & Sheridan, LLP

(57) ABSTRACT

Methods, systems and articles of manufacture are provided for query evaluation. The query is evaluated upon inputting each incremental query element (or combination of elements). Generally, for each incremental query element added, a query performance analysis is performed with respect to one or more runtime metrics such as total execution time and runtime resource consumption. The results of the analysis are provided as feedback to the user constructing the query.

17 Claims, 5 Drawing Sheets

INCREMENTAL DATA QUERY PERFORMANCE FEEDBACK MODEL

BACKGROUND OF THE INVENTION

1. Field of the Invention

The present invention generally relates to data processing and, more particularly, to query analysis.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

A DBMS is structured to accept commands to store, retrieve and delete data using, for example, high-level query languages such as the Structured Query Language (SQL). The term "query" denominates a set of commands for retrieving data from a stored database. These queries may come from users, application programs, or remote systems (clients or peers). The query language requires the return of a particular data set in response to a particular query but the method of query execution ("Query Execution Plan") employed by the DBMS is not specified by the query. The method of query execution is typically called an execution plan, an access plan, or just "plan". There are typically many different useful execution plans for any particular query, each of which returns the required data set. For large databases, the execution plan selected by the RDBMS to execute a query must provide the required data return at a reasonable cost in time and hardware resources. In general, the overall optimization process includes four broad stages. These are (1) casting the user query into some internal representation, (2) converting to canonical form, (3) choosing prospective implementation procedures, and (4) generating executable plans and choosing the cheapest of the plans.

Optimization, and execution generally, can be a resource intensive and time-consuming process. Further, the larger the database, the longer the time needed to execute the query. From the end user's standpoint, the undesirable impact of query execution overhead is increased when a plurality of queries is executed. In many data mining and data query scenarios, it is often the case that the end user does not know, at the outset, the precise data they are after. Nor does the user appreciate the performance implications of a running a particular query. In this scenario, the user typically issues a query, examines the results, modifies the query based on analysis of the results and then runs the modified query. In cases where the data being queried is very extensive and complex, this can be a very time and resource intensive process, given the duplicative processing that takes place each time the user submits a new query.

In order to prevent an excessive drain on resources, many databases are configured with query governors. A query governor prevents the execution of large and resource intensive queries by referencing a defined threshold. If the cost of executing a query exceeds the threshold, the query is not executed. However, the provision of a query governor does not address the issue faced by users (particularly novices) who do not understand the connection between a given query and the time and resources required to execute the query. Further, a query governor does not provide users any insight into what aspect of the query lead to the query being rejected by the governor.

Therefore, there is a need for providing users with information about the queries they construct, in a manner that facilitates construction of efficient and effective queries.

SUMMARY OF THE INVENTION

The present invention generally provides methods, systems and articles of manufacture for query evaluation and real time feedback.

One embodiment provides a method of providing one or more query runtime metrics to a user, comprising: receiving incremental inputs for the construction of a query; determining whether a query runtime threshold has been exceeded upon receiving each incremental input and prior to receiving a request to execute the query; and notifying the user if the query runtime threshold has been exceeded.

Another method provides real time query analysis feedback to a user. Inputs for the construction of a query are incrementally received. Upon receiving each incremental input, and prior to receiving a request to execute the query, a query runtime analysis is automatically performed with respect to one or more runtime metrics, and feedback of the query runtime analysis is provided to the user.

Yet another embodiment provides a computer readable medium containing a program which, when executed, performs an automatic operation upon receiving each incremental input for the construction of a query and prior to receiving a request to execute the query. The operation includes performing a query runtime analysis with respect to one or more runtime metrics; and providing feedback of the query runtime analysis to the user; wherein the feedback indicates the runtime effect of the input.

Still another embodiment provides a computer having (i) a user interface for inputting query elements for the construction of a query, wherein the query elements are received from a user via the input device and the user interface is rendered on the output device; and (ii) a query evaluator for iteratively performing a runtime analysis upon receiving each query element. Feedback is provided to the user via the output device after each interactive performance of the runtime analysis, wherein the feedback comprises one or more metrics calculated by the runtime analysis.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
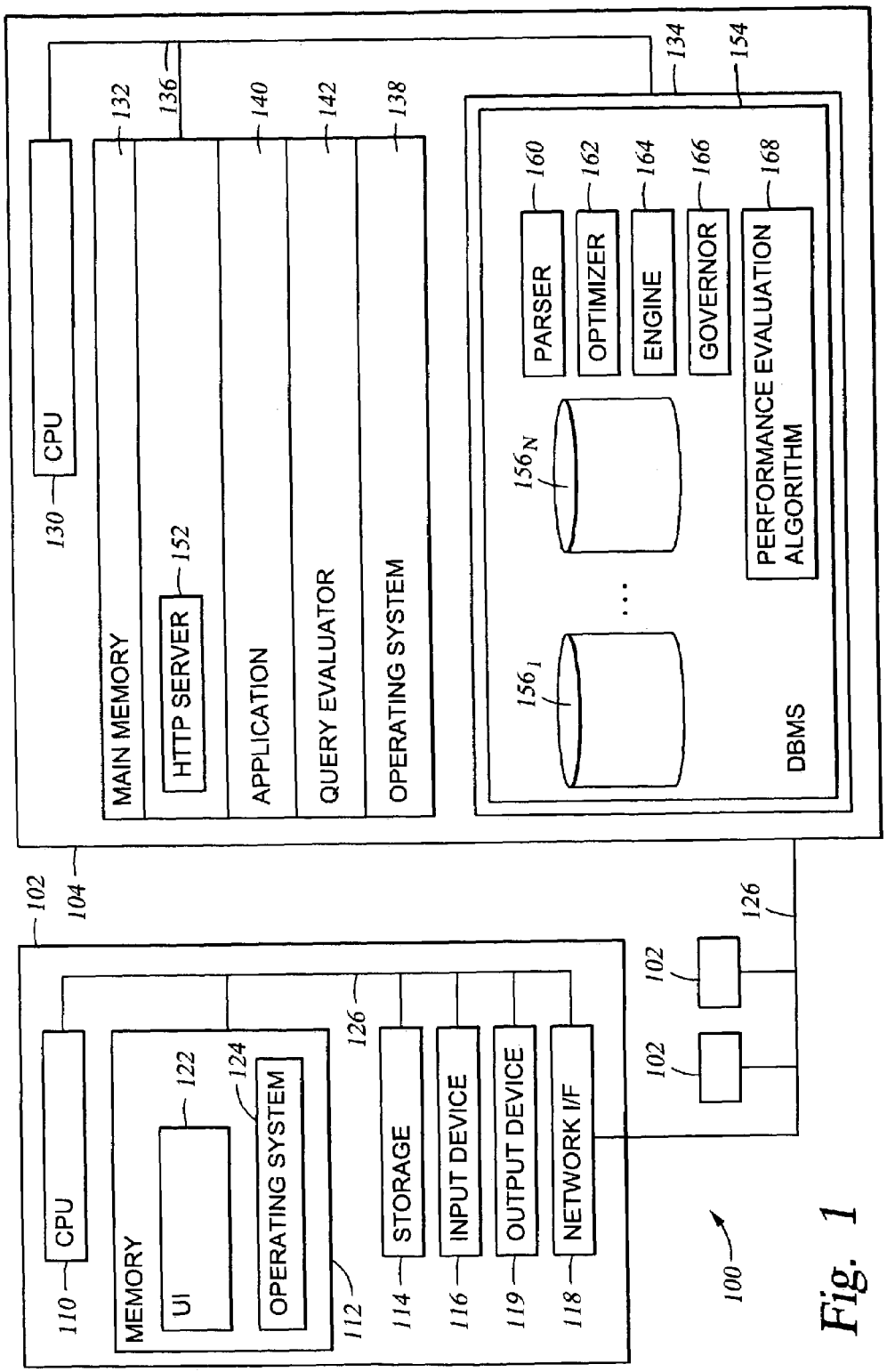
FIG. 1 is a schematic of a computer environment implementing one embodiment of the invention.

Methods, systems and articles of manufacture are provided for query evaluation and real time feedback. The query is evaluated upon inputting each incremental query element (or combination of element). An incremental query element may be, for example, a condition or Boolean operator added by a user during query construction. Generally, for each incremental query element added, a query performance analysis is performed with respect to one or more runtime metrics. Illustrative metrics include total execution time for the query and runtime resource consumption for the query. The results of the analysis are provided as real time feedback to the user constructing the query. The query may then be intelligently modified based on the feedback. As used herein, a "query" generally refers to a command or combination of commands intended to access (e.g. modify, delete, etc.) data according to specifications included in the query. Although reference is made to SQL in some embodiments, non-SQL query languages are within the scope of the present invention.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a networked system 100 in which embodiments of the present invention may be implemented. FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown.

In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a UI program 122 that, when executed on CPU 110, provides support for navigating between the various servers 104 and locating network addresses at one or more of the servers 104. In one embodiment, the UI program 122 includes a web-based Graphical User Interface (GUI), i.e., a browser, which allows the user to display Hyper Text Markup Language (HTML) information. More generally, however, the UI program 122 is representative of any user interface (whether or not GUI-based) capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. The server computer 104 includes databases $156_1 \ldots 156_N$, collectively referred to as database(s) 156. The databases 156 are representative of any collection of data regardless of the particular physical representation/arrangement or schema. By way of illustration, the databases 156 may be organized according to a relational schema (accessible by SQL queries) or according to an XML schema (accessible by XML queries). However, again, the invention is not limited to a particular schema and contemplates extension to schemas presently unknown. Illustratively, the databases 156 are shown as part of a database management system (DBMS) 154 in storage 134. The DBMS 154 may include conventional components such as a query parser 160, an optimizer 162, an engine 164 and a query governor 166 (configurable with an execution threshold which, when exceeded, prevents execution of the query). The DBMS 154 implements a performance evaluation algorithm 168 which, in one embodiment, is carried out by the query parser 160, the optimizer 162, the engine 164 and/or the query governor 166. In one embodiment, the DBMS 154 comprises the "DB2" product offered by the IBM Corporation for the MVS, AIX, or Linux or Microsoft Windows® operating systems. Generally, those skilled in the art will recognize that the present invention has application to any DBMS software that uses SQL, and may similarly be applied to non-SQL queries. More generally, however, it should be understood that the data to be accessed need not be part of a DBMS at all.

The memory 132 further includes a query/analysis application 140 (referred to herein as "application 140") and a query performance evaluator 142 (also referred to herein as "evaluator 142"). The application 140 and evaluator 142 are software products comprising a plurality of instructions that are resident at various times in various memory and storage devices in the computer system 100. When read and executed by one or more processors 130 in the server 104, the application 140 and evaluator 142 cause the computer system 100 to perform the steps necessary to execute steps or elements embodying the various aspects of the invention.

Figure 2:
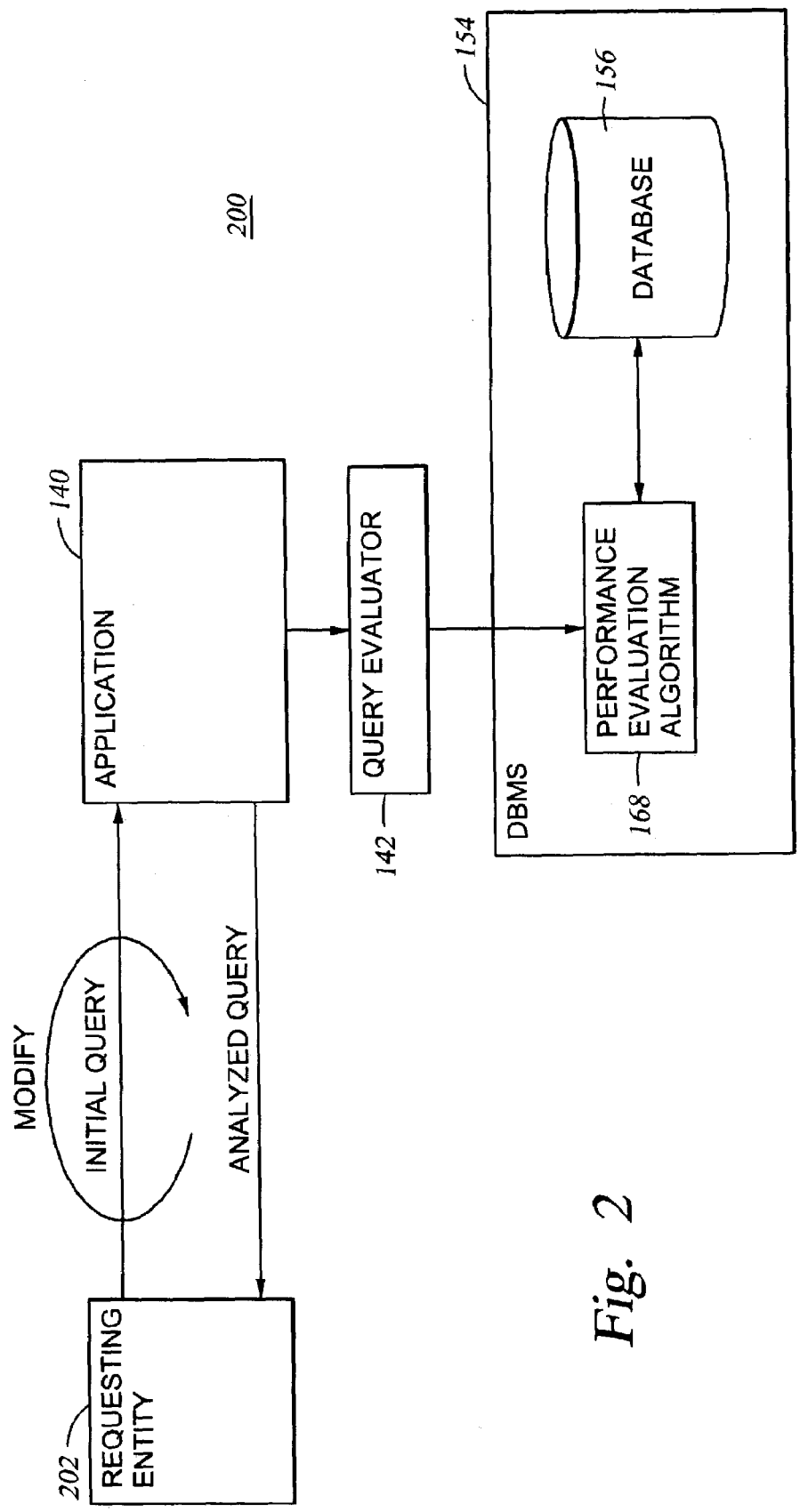
FIG. 2 is a relational view of a requesting entity, an application, a query evaluator and a database.

The relationship between a requesting entity 202, the application 140, the evaluator 142 and the databases 156 is shown in FIG. 2. In one embodiment, the application 140 iteratively receives query elements from a requesting entity 202. The requesting entity 202 may be any requesting entity, including the operating system 138, the application 140 itself or another application, and end users. The elements correspond to user input for the construction of a query. Thus, elements/inputs include query predicates and Boolean operator connectors as well as a specification of fields to include in the results generated by a query. The application 140 then calls the evaluator 142 to interact with the DBMS 154 to perform an analysis based on one or more runtime metrics. In a particular embodiment, the evaluator 142 invokes with the performance evaluation algorithm 168 to perform the analysis. The feedback of the analysis is provided to the end user, e.g., via the UI 122. Runtime metrics include any metrics characterizing the performance of the query. For example, runtime metrics include cost metrics such as total execution time and resource consumption (e.g., CPU consumption and logical I/O operations). Because the analysis is performed iteratively during query construction, the feedback is real time information which the user may use to gain meaningful insight into the query and the independent effects of its various elements. The resulting insight may also be used to intelligently modify the query and ensure an execution plan cost that is within limits acceptable to the user, or within limits set for the DBMS by an administrator. In this way the user's expectations regarding the cost of the query are well-defined prior to executing the query. That is, a user can know that a given query will require, for example, 4 hours to run.

FIGS. 1 and 2 are merely illustrative and not limiting of the invention to a particular software or hardware architecture. Thus, although shown as separate elements, the application 140 and the evaluator 142 may be integral software components. In one embodiment, the application 140 and the evaluator 142 may be integral to the DBMS 154. In particular, the evaluator 142 may be functionality integrated within the optimizer 162 and database engine 164, and used in conjunction with the query governor 166. However, evaluator 142 is shown separately to emphasize that it is preferably an adaptable layer of functionality disposed over potentially multiple DBMS implementations. Thus, it is contemplated that a standard interface may be defined for the application 140 to use for performance feedback, regardless of the particular method of interface provided for such purposes by the underlying DBMS. In one embodiment, the DBMS the governor 166 is set to an arbitrarily low threshold. The threshold is selected to prevent execution of every stage of the query during construction (as opposed to submission for actual execution). For each query input from the user, the evaluator 142 interacts with an interface provided by the DBMS for the retrieval of performance estimates (metrics) by executing the performance evaluation algorithm 168. In one embodiment, the evaluator 142 interfaces with the query optimizer 162 to determine various metrics according to well-known techniques. Alternatively, the metrics are generated by a separate performance evaluation algorithm that does not invoke the optimizer. In any case, these metrics are provided as feedback to the user.

Figure 3:
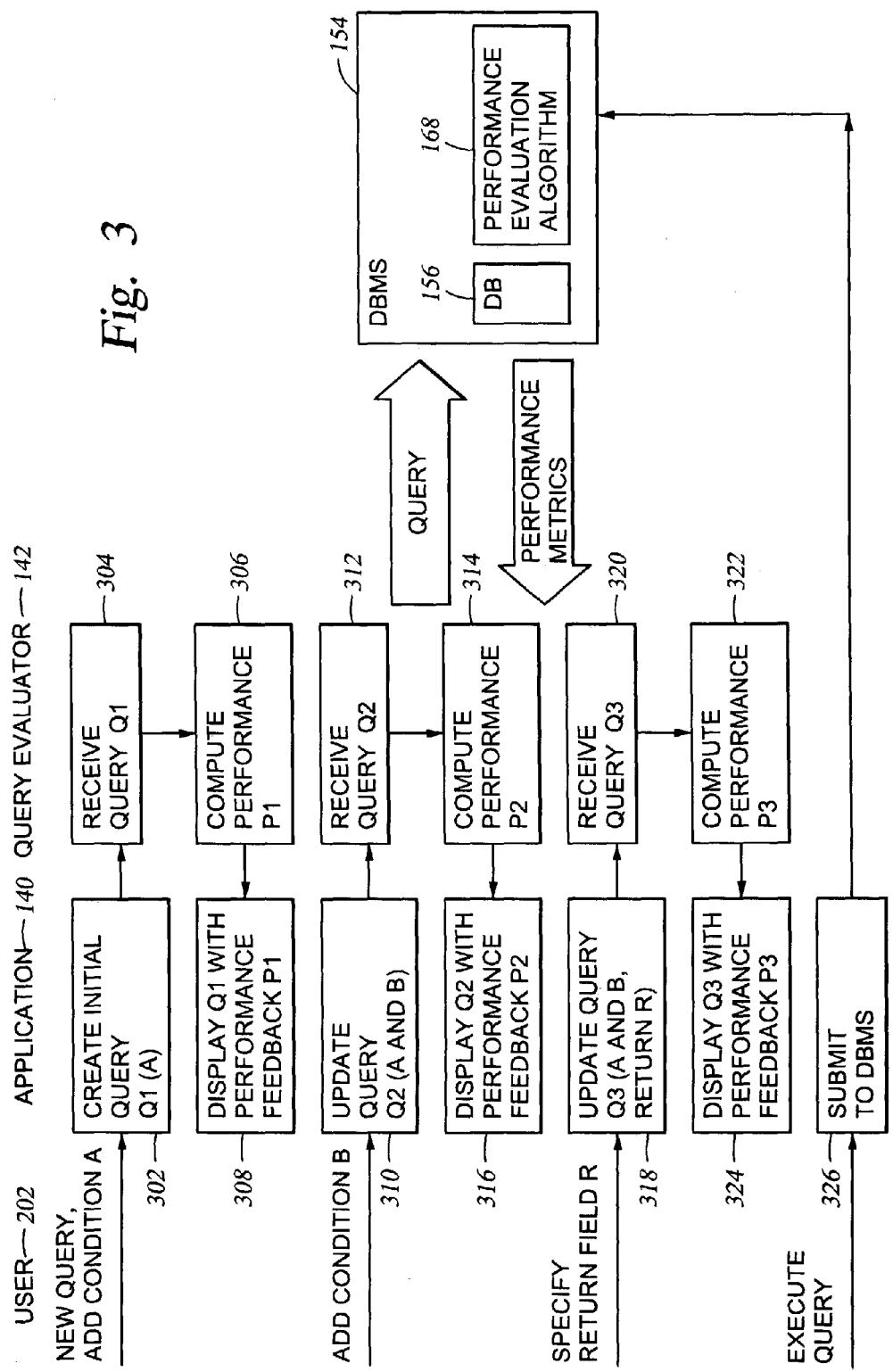
FIG. 3 is a flow chart illustrating one embodiment of query evaluation.

A more detailed representation of the query evaluation operation is described with reference to FIG. 3. Illustratively, the requesting entity 202 is a user. The evaluation process is initiated when the user 202 begins construction of a new query by specifying a query element (condition A) to the application 140 (step 302), which creates a parsable query (Q1). The query is submitted (step 304) to the query evaluator 142 which then takes steps to estimate (step 306) the runtime performance of the query with respect to one or more metrics. Specifically, evaluator 142 submits the query to the database management system 154 and requests the one or more performance metrics, which are determined by the performance evaluation algorithm 168. The performance metrics may be metrics commonly computed by database management systems during optimization and access plan determination. Accordingly, the present invention may be implemented into existing database management systems with little or no architectural changes to the database management system. However, in the present invention, the database management system 154 is prevented from executing the query received from the query evaluator 142. Instead, the database management system 154 calculates the performance metrics, and then provides the performance metrics to the query evaluator 142. In turn, the query evaluator 142 provides the performance metrics to the application 140, which then displays the performance metrics to the user as feedback (P2) for the initial query (Q1).

The foregoing process may be repeated for each incremental modification to query. For example, steps 310–316 represent an evaluation of a second query (Q2) generated by adding a second condition (condition B) to the first condition (condition A). The feedback (P2) provided to the user at step 316 indicates the performance of the second query (Q2). It is also contemplated that the user may specify return fields as part of a query. Accordingly, steps 318–324 represent a query evaluation performed in response to a return field (R) specification.

In this manner, query performance is evaluated for each incremental modification. It should be noted that performance evaluation occurs even without an explicit user request for evaluation. Instead, a parsable query is automatically recognized by the application 140 each time the user 202 specifies another query element, or modifies a previous element (although it is contemplated that performance evaluation may be performed only when explicitly requested by the user). Further, the query is not executed until receiving an explicit execution command from the user 202, upon which the application 140 submits (step 326) the query to the database management system 154. In one embodiment, a selected access plan developed in the immediately previous iteration of the performance evaluation (i.e., the iteration immediately prior to execution) is cached so that when the query is subsequently submitted for execution the access plan is retrieved from cache and need not be generated again. Of course, such an approach assumes the cached plan has not been rendered obsolete by changes to the data or schema.

In one embodiment, elements of a query are specified by a user through a graphical user interface (GUI) represented by the UI program 122 (FIG. 1). Likewise, the feedback from the evaluator 142 may be provided to the user through the UI program 122. The content of the user interface screens may be generated by the application 140. In a particular embodiment, the user interface content is hypertext markup language (HTML) content which may be rendered on the client computer systems 102 with the UI program 122. Accordingly, as shown in FIG. 1, the memory 132 includes a Hypertext Transfer Protocol (http) server process 152 (e.g., a web server) adapted to service requests from the client computer 102. For example, the process 138 may respond to requests to access a database(s) 156, which illustratively resides on the server 104. Incoming client requests for data from a database 156 invoke the application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the UI program 122. The http server process 152 shown in FIG. 1 is merely illustrative and other embodiments adapted to support any known and unknown protocols are contemplated.

Figure 4:
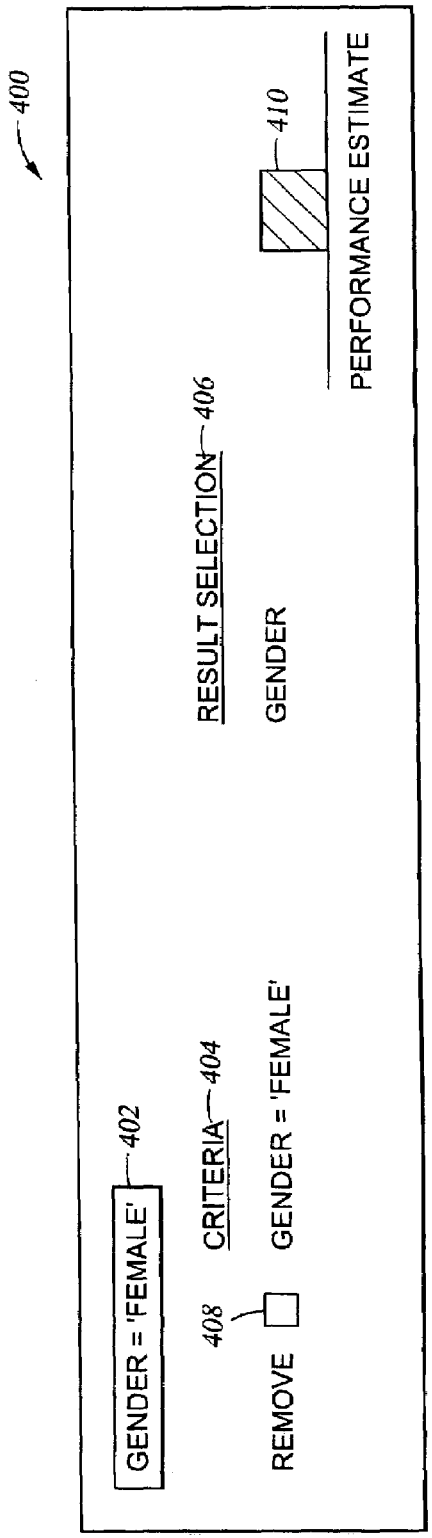
FIG. 4 is a one embodiment of a graphical user interface screen formatted with a query input field and a graphical performance estimate element.

Referring now to FIG. 4, one embodiment of a user interface screen 400 of the user interface 122 is shown. The user interface screen 400 generally includes an input window 402 for inputting query elements, a criteria column 404, and a result selection column 406. The criteria column 404 displays each of the query conditions used for data selection individually. Each condition under the criteria column 404 includes an associated checkbox 408 for selectively removing the condition from the query. Further, the result selection column 406 includes specifications of result fields. The field names in the result selection column 406 indicate the name of the field associated with data selected via the corresponding query condition in the criteria column 404.

Illustratively, the user has input the query condition "Gender='Female'" into the input window 402. Because this input is a parsable query condition (as determined by the application 140), the condition is recognized as an update event and provided to the evaluator 142 for a determination of performance metrics. The resulting performance estimate is displayed in the form of a sliding bar 410. However, the performance estimate may be provided to the user in any variety of ways including graphically, textually (e.g. with numeric values), and audibly. Further, although only one sliding bar 410 is shown (collectively representing one or more performance metrics), is contemplated that a number of sliding bars may be displayed, each representing separate metrics. Further, the bars rendered for each performance may be preserved and displayed in series to illustrate the evolution of the query being modified. The user may then be given the option to click on any one of the "evolution bars" and be returned to the query corresponding to that stage/iteration of evolution.

Figure 5:
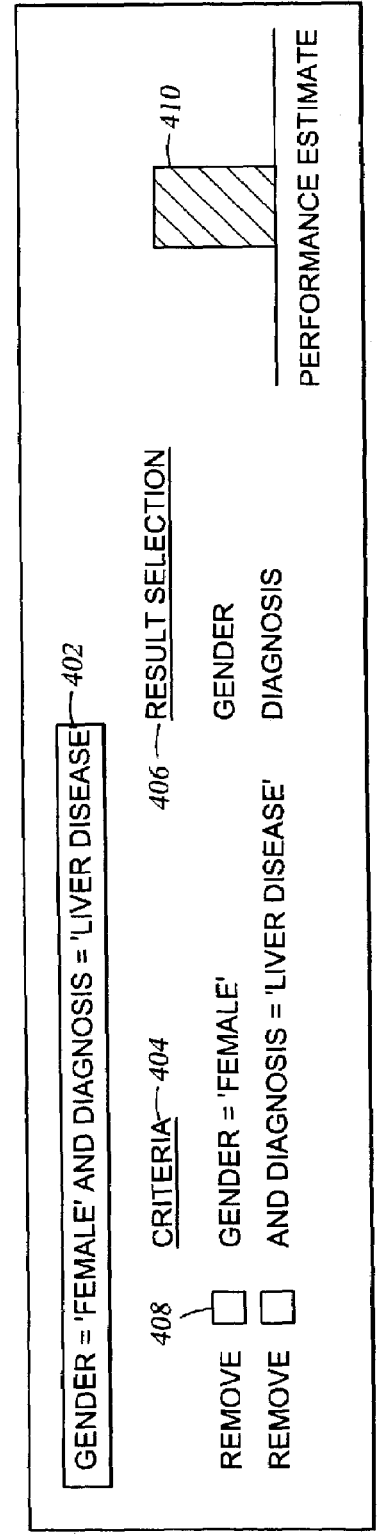
FIG. 5 is the graphical user interface screen of FIG. 4 illustrating a change to the graphical performance estimate element in response to modifying the query.
Figure 6:
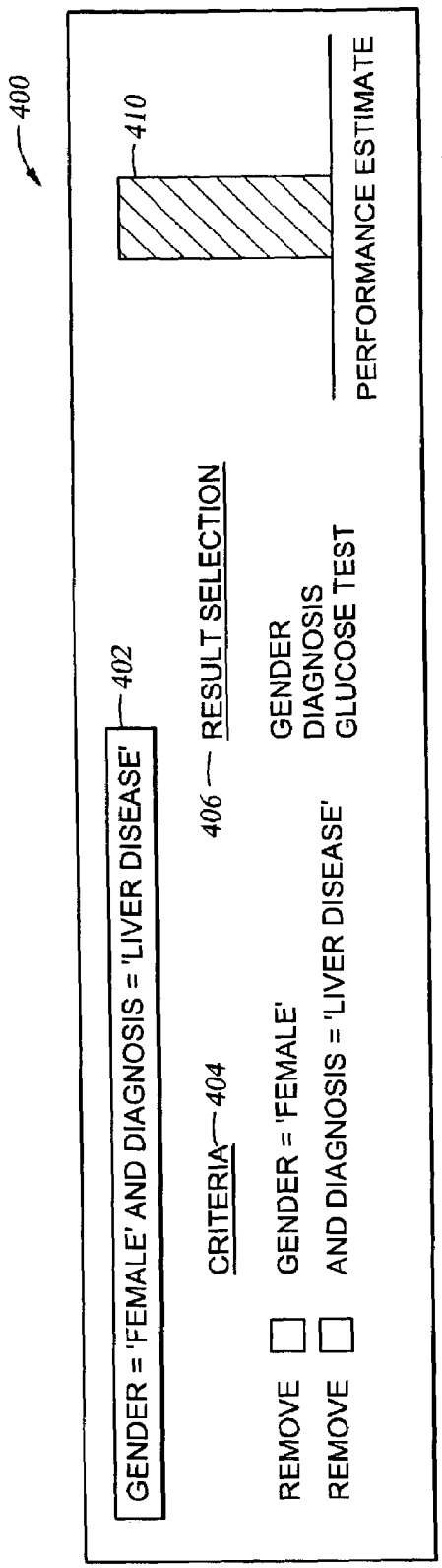
FIG. 6 is the graphical user interface screen of FIG. 5 illustrating a change to the graphical performance estimate element in response to specifying an additional result field selection.
Figure 7:
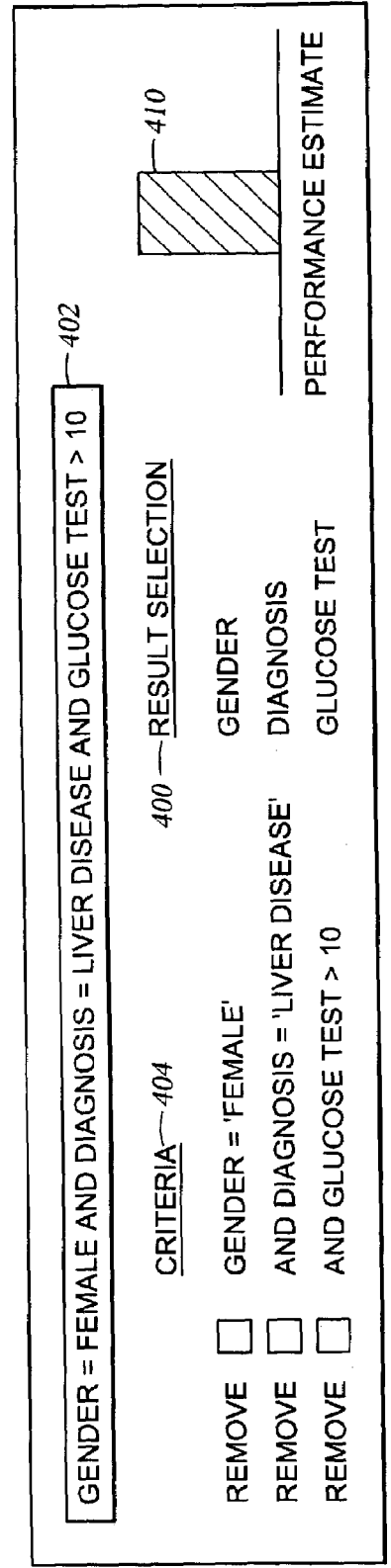
FIG. 7 is the graphical user interface screen of FIG. 4 illustrating a change to the graphical performance estimate element in response to adding a condition to the query that restricts the scope of the results.

The sliding bar 410 is adjusted for each added query condition. For example, FIG. 5 shows an increase in the performance estimate as a result of the user adding a second condition (AND Diagnosis='Liver Disease') and specifying another result field (Diagnosis) in the result selection column 406. The performance estimate is further increased in FIG. 6 upon user specification of a Glucose Test result field, as shown in the result selection column 406. FIG. 7 illustrates that the performance estimation may also decrease with additional conditions, where such conditions are restrictive. As illustrated, the user restricted the results set to those patients having a glucose test with a value less than 10.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing one or more query runtime metrics to a user, comprising:

receiving incremental inputs for the construction of a query;

automatically determining whether a query runtime threshold has been exceeded upon receiving each incremental input and prior to receiving a request to execute the query;

if the query runtime threshold has been exceeded, notifying the user; and further comprising visually indicating at least one query runtime metric to the user upon receiving each input, wherein the at least one query runtime metric comprises at least one of an amount of time required to run the query and resources required to run the query.

2. The method of claim 1, wherein determining whether the query runtime threshold has been exceeded comprises invoking a query governor.

3. The method of claim 1 wherein receiving inputs comprises receiving query conditions.

4. A computer-implemented method of providing real time query analysis feedback to a user, comprising:

incrementally receiving inputs for the construction of a query;

upon receiving each incremental input, and prior to receiving a request to execute the query:

automatically performing a query runtime analysis with respect to one or more runtime metrics, wherein performing the query runtime analysis comprises determining whether a runtime threshold has been exceeded; and providing feedback of the query runtime analysis to the user.

5. The method of claim 4, wherein providing feedback comprises indicating an estimated cost of executing the query.

6. The method of claim 4, wherein providing feedback comprises indicating at feast one of a total execution time for the query and a resource consumption indication for the query.

7. The method of claim 4, wherein providing feedback comprises displaying the feedback in a graphical user interface.

8. The method of claim 4, wherein determining whether the query runtime threshold has been exceeded comprises invoking a query governor.

9. A tangible computer readable storage medium containing a program which, when executed, performs an automatic operation,-comprising:

upon receiving each incremental input for the construction of a query and prior to receiving a request to execute the query:

performing a query runtime analysis with respect to one or more runtime metrics, wherein performing the query runtime analysis comprises determining whether a runtime threshold has been exceeded; and providing feedback of the query runtime analysis to the user; wherein the feedback indicates the runtime effect of the input.

10. The computer readable medium of claim 9, wherein the feedback comprises at least one of a total execution time for the query and a resource consumption indication for the query.

11. The computer readable medium of claim 9, wherein the feedback comprises an estimated cost of executing the query.

12. The computer readable medium of claim 9, wherein providing feedback comprises displaying the feedback in a graphical user interface.

13. The computer readable medium of claim 9, wherein determining whether the query runtime threshold has been exceeded comprises invoking a query governor.

14. A computer comprising a processing unit, an input device, and an output device, the computer further comprising:

a memory and a processor;

a user interface for inputting query elements for the construction of a query; wherein the query elements are received from a user via the input device and the user interface is rendered on the output device;

a query evaluator for iteratively performing a runtime analysis upon receiving each query element and providing feedback to the user via the output device after each interactive performance of the runtime analysis, wherein the feedback comprises one or more metrics calculated by the runtime analysis; and a database management system including a governor configured to prevent execution of queries having estimated runtimes in excess of a specified threshold, and wherein the evaluator uses the governor to perform the runtime analysis.

15. The computer of claim 14, wherein the one or more metrics are query execution cost metrics.

16. The computer of claim 14, wherein the one or metrics comprise at least one of a total query execution time and a query execution resource consumption indication.

17. The computer of claim 14, wherein the user interface is a graphical user interface.

* * * * *